(12) United States Patent
Boorananut et al.

(10) Patent No.: US 6,546,523 B1
(45) Date of Patent: Apr. 8, 2003

(54) HIGH SPEED FIRST PASS YIELD REPORT PROGRAM AND METHOD

(75) Inventors: Sedta Boorananut, Nonthaburi (TH); Jitrayut Junnapart, Nonthaburi (TH); Adunkitt Mankhong, Nonthaburi (TH)

(73) Assignee: Advanced Micro Devices, Inc., Sunnyvale, CA (US)

( * ) Notice: Subject to any disclaimer, the term of this patent is extended or adjusted under 35 U.S.C. 154(b) by 115 days.

(21) Appl. No.: 09/660,066

(22) Filed: Sep. 12, 2000

(51) Int. Cl.[7] .................. G06F 17/50; G06F 15/167; G06F 15/00; H02H 3/05; G05B 9/02; G09G 5/00
(52) U.S. Cl. .............. 716/4; 716/1; 716/2; 716/10; 716/19; 714/38; 709/213; 700/82; 345/826; 707/526
(58) Field of Search .............................. 716/4

(56) References Cited

U.S. PATENT DOCUMENTS

| | | | | |
|---|---|---|---|---|
| 5,287,514 A | * | 2/1994 | Gram | 345/826 |
| 5,335,342 A | * | 8/1994 | Pope et al. | 714/38 |
| 5,729,466 A | * | 3/1998 | Bamji | 716/10 |
| 5,748,470 A | * | 5/1998 | Hager et al. | 700/82 |
| 5,777,901 A | * | 7/1998 | Berezin et al. | 716/19 |
| 5,898,595 A | * | 4/1999 | Bair et al. | 716/2 |
| 6,088,712 A | * | 7/2000 | Huang et al. | 707/526 |
| 6,163,801 A | * | 12/2000 | O'Donnell et al. | 709/213 |
| 6,233,719 B1 | * | 5/2001 | Hardikar et al. | 716/1 |
| 6,298,470 B1 | * | 10/2001 | Breiner et al. | 716/4 |

* cited by examiner

*Primary Examiner*—Matthew Smith
*Assistant Examiner*—Andrea Liu
(74) *Attorney, Agent, or Firm*—Amin & Turocy, LLP

(57) ABSTRACT

A method and software macro are disclosed for generating a first pass yield report, which may be employed in the manufacture and testing of semiconductor products. The method comprises obtaining raw data from a workstream database, executing a software macro in a computer system, and generating a first pass yield report comprising final yield data calculated via the macro. The macro may comprise computer-executable instructions for formatting the raw data, sorting the formatted data, and calculating final yield data by package type.

20 Claims, 15 Drawing Sheets

| | A | B | C | D | E | F | G | H | I | J | K | L |
|---|---|---|---|---|---|---|---|---|---|---|---|---|
| 714 | 5215830RETEST | 00/02/14 | 22:40:18 | 22:46:24 | 19 | 2 | 17 | 2 | 0 | 0 | 0 | 0 | 0 | 1 | 0 | 1 |
| 715 | 5215840NORMAL | 00/02/14 | 21:04:40 | 21:36:41 | 576 | 571 | 6 | 571 | 0 | 0 | 0 | 0 | 0 | 0 | 0 | 0 |
| 716 | 5215840RETEST | 00/02/14 | 21:43:25 | 21:52:18 | 5 | 3 | 2 | 3 | 0 | 0 | 0 | 0 | 0 | 0 | 0 | 0 |
| 717 | 5215860NORMAL | 00/02/13 | 10:54:10 | 0:01:12 | 10139 | 9923 | 216 | 9651 | 272 | 0 | 0 | 0 | 0 | 2 | 0 | 1 |
| 718 | 5215860RETEST | 00/02/14 | 0:05:33 | 1:08:08 | 216 | 86 | 130 | 86 | 0 | 0 | 0 | 0 | 2 | 0 | 0 | 18 |
| 719 | 5215870NORMAL | 00/02/14 | 5:31:18 | 14:08:59 | 12047 | 11686 | 359 | 11680 | 8 | 0 | 0 | 0 | 2 | 1 | 1 |
| 720 | 5215870RETEST | 00/02/14 | 14:14:14 | 15:12:54 | 359 | 218 | 141 | 218 | 0 | 0 | 0 | 0 | 2 | 1 | 0 |
| 721 | 5215970NORMAL | 00/02/14 | 6:03:06 | 10:30:08 | 16975 | 16802 | 173 | 5427 | 11374 | 1 | 0 | 0 | 10 | 1 |
| 722 | 5215970RETEST | 00/02/14 | 10:35:09 | 10:44:56 | 173 | 58 | 115 | 16 | 36 | 0 | 0 | 6 | 10 | 1 | 0 |
| 723 | 5215990NORMAL | 00/02/15 | 8:42:58 | 13:01:58 | 16491 | 16291 | 200 | 3659 | 12431 | 1 | 0 | 0 | 11 | 0 |
| 724 | 5215990RETEST | 00/02/15 | 13:08:06 | 13:21:15 | 200 | 90 | 110 | 24 | 66 | 0 | 0 | 0 | 11 | 0 | 0 |
| 725 | 5216000NORMAL | 00/02/15 | 2:59:05 | 8:22:40 | 19200 | 19025 | 175 | 4637 | 14388 | 0 | 0 | 0 | 12 | 4 | 0 |
| 726 | 5216000RETEST | 00/02/15 | 8:27:10 | 8:39:58 | 175 | 66 | 109 | 23 | 41 | 0 | 1 | 0 | 1 | 12 | 0 | 0 | 3 |
| 727 | 5216010NORMAL | 00/02/14 | 2:54:23 | 11:48:53 | 12012 | 11725 | 287 | 11709 | 16 | 0 | 0 | 0 | 7 | 0 | 2 |
| 728 | 5216010RETEST | 00/02/14 | 11:54:08 | 12:46:27 | 287 | 133 | 154 | 133 | 0 | 0 | 0 | 0 | 7 | 0 | 0 |
| 729 | 5216020NORMAL | 00/02/16 | 3:24:48 | 16:38:20 | 16574 | 14783 | 1791 | 14226 | 557 | 1 | 0 | 0 | 10 | 0 |
| 730 | 5216020RETEST | 00/02/16 | 16:45:56 | 21:26:43 | 1791 | 1113 | 678 | 1067 | 46 | 0 | 0 | 0 | 11 | 0 | 1 |
| 731 | 5216030NORMAL | 00/02/16 | 4:51:51 | 19:48:19 | 10969 | 10685 | 284 | 10631 | 53 | 1 | 0 | 0 | 3 | 1 | 2 |
| 732 | 5216030RETEST | 00/02/16 | 19:51:37 | 21:19:50 | 284 | 112 | 172 | 109 | 3 | 0 | 0 | 0 | 3 | 1 | 0 |
| 733 | 5216040NORMAL | 00/02/16 | 3:04:14 | 11:29:25 | 11974 | 11828 | 146 | 11791 | 37 | 0 | 0 | 0 | 4 | 2 | 0 |
| 734 | 5216040RETEST | 00/02/16 | 11:34:56 | 12:09:58 | 210 | 99 | 111 | 99 | 0 | 0 | 0 | 0 | 4 | 0 | 0 |
| 735 | 5216050NORMAL | 00/02/15 | 18:42:37 | 2:10:33 | 11057 | 10943 | 114 | 10830 | 113 | 0 | 0 | 0 | 1 | 0 | 0 |
| 736 | 5216050RETEST | 00/02/16 | 2:18:05 | 2:37:40 | 114 | 21 | 20 | 1 | 0 | 0 | 0 | 0 | 1 | 0 | 0 | 10 |

| | A | B | C | D | E | F | G | H | I | J | K | L |
|---|---|---|---|---|---|---|---|---|---|---|---|---|
| 277 | 5147300 | NORMAL | 00/02/07 | 11:02:56 | 12:00:40 | 3379 | 2753 | 626 | 2720 | 8 | 19 | 1 |
| 278 | 5147300 | RETEST | 00/02/07 | 12:07:20 | 12:13:02 | 43 | 87 | 510 | 85 | 0 | 2 | 0 |
| 279 | 5147310 | NORMAL | 00/02/07 | 12:22:19 | 13:05:15 | 5272 | 4397 | 875 | 4327 | 17 | 50 | 0 |
| 280 | 5147310 | RETEST | 00/02/07 | 14:50:55 | 15:00:06 | 60 | 139 | 705 | 137 | 1 | 1 | 0 |
| 281 | 0954190 | NORMAL | 00/02/09 | 7:31:05 | 13:03:40 | 7206 | 5297 | 1909 | 5145 | 151 | 1 | 0 |
| 282 | 0954190 | RETEST | 00/02/09 | 13:06:24 | 17:10:32 | 1913 | 1750 | 163 | 1748 | 2 | 0 | 0 |
| 283 | 5053650 | NORMAL | 00/02/10 | 5:32:53 | 7:37:45 | 23043 | 22589 | 454 | 20993 | 1493 | 35 | 10 |
| 284 | 5053650 | RETEST | 00/02/10 | 7:39:46 | 7:57:44 | 50 | 241 | 209 | 202 | 20 | 8 | 3 |
| 285 | 5179540 | NORMAL | 00/02/10 | 1:26:39 | 14:08:39 | 29889 | 26484 | 3405 | 26424 | 52 | 6 | 2 |
| 286 | 5179540 | RETEST | 00/02/10 | 14:13:22 | 17:57:14 | 1664 | 2881 | 278 | 2872 | 9 | 0 | 0 |
| 287 | 5218300 | NORMAL | 00/02/10 | 17:37:11 | 2:49:05 | 20291 | 19115 | 1176 | 2202 | 16582 | 0 | 323 |
| 288 | 5108910 | RETEST | 00/02/11 | 16:44:11 | 17:34:13 | 1092 | 1062 | 30 | 0 | 1061 | 1 | 0 |
| 289 | 5108910 | NORMAL | 00/02/11 | 17:38:28 | 17:43:07 | 30 | 27 | 3 | 0 | 27 | 0 | 0 |
| 290 | 5174750 | RETEST | 00/02/11 | 5:03:01 | 6:38:22 | 17704 | 16857 | 847 | 0 | 16351 | 499 | 5 |
| 291 | 5174750 | NORMAL | 00/02/11 | 15:30:17 | 16:02:01 | 838 | 727 | 111 | 0 | 710 | 17 | 0 |
| 292 | 5212870 | RETEST | 00/02/11 | 0:25:52 | 4:05:37 | 591 | 561 | 30 | 0 | 6 | 315 | 0 |
| 293 | 5218300 | NORMAL | 00/02/11 | 2:52:01 | 3:35:02 | 1184 | 767 | 417 | 21 | 716 | 0 | 22 |
| 294 | 5220490 | RETEST | 00/02/11 | 11:55:05 | 21:28:14 | 21422 | 21261 | 161 | 21260 | 0 | 1 | 0 |
| 295 | 5220490 | NORMAL | 00/02/11 | 21:33:01 | 21:44:57 | 254 | 179 | 75 | 179 | 0 | 0 | 0 |
| 296 | 5053660 | RETEST | 00/02/12 | 12:42:58 | 15:26:07 | 5482 | 5289 | 193 | 5113 | 172 | 2 | 2 |
| 297 | 5053660 | NORMAL | 00/02/12 | 15:31:58 | 15:48:01 | 193 | 178 | 15 | 170 | 8 | 0 | 0 |
| 298 | 5212630 | RETEST | 00/02/12 | 3:09:11 | 8:49:49 | 10049 | 3614 | 6435 | 3328 | 286 | 0 | 0 |
| 299 | 5215670 | NORMAL | 00/02/12 | 5:19:48 | 11:51:13 | 11189 | 3635 | 7554 | 3475 | 160 | 0 | 0 |

Fig. 4C

| | A | B | C | D | E | F | G | H | I | J | K |
|---|---|---|---|---|---|---|---|---|---|---|---|
| 1 | Lot | Test | Package | ST1_ID | ST2_ID | Dev | M/C | Prog | Rev | Temp | Bd |
| 2 | 522110 | NORMAL | PL-32 | NON-000 | X37-00002 | 98208 | ADV#AMD18 | FT208FA | ;0.S | 9000 | |
| 3 | 5147300 | NORMAL | PL-32 | X37-00004 | NON-0000 | 98A08 | ADV#AMD18 | FT208FA | ;0.S | 9000/ | |
| 4 | 5147310 | NORMAL | PL-32 | X37-00004 | X37-00007 | 98A08 | ADV#AMD18 | FTA08FA | ;0.5 | 9000/02 | |
| 5 | 5174750 | NORMAL | PL-32 | X37-00004 | X37 | INFO DESIRED FOR YIELD REPORT | | | | 000/02/ | |
| 6 | 5174780 | NORMAL | PL-32 | X37-00004 | X37 | | | | | 000/02/1 | |
| 7 | 5175640 | NORMAL | PL-32 | X37-00004 | X37-00000 | 98C08 | ADV#AMD18 | FT208FA | ;0.7 | 9000/02/13 | |
| 8 | 5220990 | NORMAL | PL-32 | X37-00004 | X37-00000 | 98C08 | ADV#AMD18 | FT208FA | ;0.7 | 9000/02/14 | |
| 9 | 5221000 | NORMAL | PL-32 | X37-00004 | X37-00002 | 98102 | ADV#AMD18 | FT102FA | ;0.H | 9000/02/1 | |
| 10 | 5221070 | NORMAL | PL-32 | X37-00004 | X37-00002 | 98106 | ADV#AMD18 | FT102FA | ;0.H | 9000/02 | |
| 11 | 5221080 | NORMAL | PL-32 | X37-00004 | X37-00002 | 98208 | ADV#AMD18 | FT108FA | ;0.P | 9000/0 | |
| 12 | 5221130 | NORMAL | PL-32 | X37-00004 | X37-00002 | 98208 | ADV#AMD18 | FT208FA | ;0.S | 9000/0 | |
| 13 | 5221190 | NORMAL | PL-32 | X37-00004 | X37-00002 | 98108 | ADV#AMD18 | FT108FA | ;0.P | 9000/0 | |
| 14 | 5221210 | NORMAL | PL-32 | X37-00004 | X37-00002 | 98102 | ADV#AMD18 | FT102FA | ;0.H | 90 00/0 | |
| 15 | 5175360 | NORMAL | PL-32 | X37-00004 | X37-00002 | 98C08 | ADV#AMD18 | FT208FA | ;0.H | 9000/02 | |
| 16 | 5220610 | NORMAL | PL-32 | X37-00004 | X37-00002 | 98C | PACKAGE WORKSHEET | | | 9000/02/1 | |
| 17 | 5220880 | NORMAL | PL-32 | X37-00004 | X37-00002 | 98A | | | | 9000/02/20 | |
| 18 | 5253300 | NORMAL | PL-32 | X37-00004 | X37-00002 | 98C | | | | 9000/02/17 | |
| 19 | | | | | | | | | | | |
| 20 | 5221110 | NORMAL | PL-32 | X37-00004 | X37-00002 | 9820 | ADV#AMD18 | FT208FA | | 9000/0 | |
| 21 | 5147300 | NORMAL | PL-32 | X37-00004 | X37-00002 | 98A99 | ADV#AMD18 | FT208FA | | 9000/ | |

| | Rev | Temp | Bdate | Btime | EndTime | Qin | Qout | Yield | O/S Yield | Rej |
|---|---|---|---|---|---|---|---|---|---|---|
| 08FA | ;0.S | 90 | 00/02/16 | 3:10:20 | 10:22:00 | 745 | 7339 | 98.47 | 0.09 | 11 |
| 08FA | ;0.S | 90 | 00/02/15 | 23:54:38 | 2:40:13 | 2535 | 2465 | 97.24 | 0.16 | 7 |
| 07FA | ;0.4 | 90 | 00/02/18 | 5:51:59 | | | | | 1.28 | 22 |
| 8FA | ;0.4 | 90 | 00/02/18 | 15:59:42 | INFO DESIRED FOR YIELD REPORT | | | | 0.31 | 23 |
| FA | ;0.P | 90 | 00/02/17 | 8:16:18 | 14:40:20 | 15103 | 14746 | 97.48 | 0.96 | 38 |
| | ;0.7 | 90 | 00/02/18 | 5:05:12 | 8:05:41 | 6325 | 6064 | 95.87 | 3.26 | 28 |
| | ;0.4 | 90 | 00/02/18 | 10:26:17 | 15:14:42 | 5022 | 4861 | 96.79 | 1.12 | 18 |
| FA | ;0.H | 90 | 00/02/14 | 7:28:36 | 16:43:29 | 18013 | 17693 | 98.22 | 0.63 | 32 |
| 2FA | ;0.H | 90 | 00/02/15 | 4:06:09 | 14:52:05 | 20252 | 19800 | 97.77 | 0.58 | 45 |
| 08FA | ;0.P | 90 | 00/02/15 | 16:17:08 | 0:25:23 | 20104 | 19568 | 97.33 | 1.27 | 53 |
| 108FA | ;0.S | 90 | 00/02/18 | 19:49:51 | 4:21:57 | 8689 | 8423 | 96.94 | 0.71 | 26 |
| 108FA | ;0.P | 90 | 00/02/17 | 12:28:39 | 17:29:12 | 10046 | 9565 | 95.21 | 3.31 | 48 |
| 08FA | ;0.H | 90 | 00/02/17 | 18:22:47 | 4:19:11 | 20422 | 19851 | 97.2 | 1.68 | 57 |
| 8FA | ;0.H | 90 | 00/02/18 | 6:43:50 | 14:11:15 | 15229 | 14449 | 94.86 | 4.1 | 78 |
| FA | ;0.H | 90 | | | | 15046 | 13948 | 92.69 | 4.28 | 110 |
| | ;0.H | 90 | PACKAGE WORKSHEET | | | 8170 | 7473 | 91.47 | 2.66 | 69 |
| | | 90 | | | | 5010 | 4668 | 93.17 | 2.75 | 34 |
| | | | | | 1ST PASS | 319317 | 307341 | 96.25 | 1.41 | 1232 |
| 08FA | | 90 | 00/02/16 | 1:19:22 | 11:20:02 | 8252 | 8139 | 98.63 | 0.19 | 11 |
| 208FA | | 90 | 00/02/07 | 11:02:56 | 12:00:40 | 3379 | 2846 | 84.05 | 0.06 | 53 |

Fig. 4D-2

HIGH SPEED FIRST PASS YIELD REPORT PROGRAM AND METHOD

FIELD OF INVENTION

The present invention relates generally to semiconductor manufacturing, and more particularly to a program and method for generating a semiconductor test first pass yield report.

BACKGROUND OF THE INVENTION

In the semiconductor industry there is a continuing trend toward high line rate production of integrated circuit products. In order to achieve high quantity production as well as quality assurance, there have been, and continue to be, efforts toward providing automated testing of production parts as well as detailed analysis of test results. The production of semiconductor integrated circuits typically involves a multi-step manufacturing process in which defects or errors may be introduced into a product at one or more steps in the process. Manufacturing and process engineers study the defect rates and product yields as well as the efficiency associated with such multi-step manufacturing processes and the individual steps therein, in order to determine where changes in a process may improve the product, reduce cost, save time, and the like. In particular, the initial or first run of a given manufacturing process needs to be carefully scrutinized so that any necessary adjustments may be made prior to approving the process for further production.

Another trend in the semiconductor industry is the reduction of feature sizes and an increase in device density in integrated circuit products. Such features may include the width and spacing of interconnecting lines and the surface geometry such as the corners and edges of various features. The requirement of small features with close spacing between adjacent features requires high resolution photo lithographic processes. In general, lithography refers to processes for pattern transfer between various media. It is a technique used for integrated circuit fabrication in which, for example, a silicon wafer is coated uniformly with a radiation-sensitive film (e.g, a photoresist), and an exposing source (such as ultraviolet light, x-rays, or an electron beam) illuminates selected areas of the film surface through an intervening master template (e.g., a mask or reticle) to generate a particular pattern. The exposed pattern on the photoresist film is then developed with a solvent called a developer which makes the exposed pattern either soluble or insoluble depending on the type of photoresist (i.e., positive or negative resist). The soluble portions of the resist are then removed, thus leaving a photoresist mask corresponding to the desired pattern on the silicon wafer for further processing.

In addition to reduced feature sizes and device density increases, the introduction of larger and larger wafers makes defects in a single wafer potentially more costly than that of a smaller wafer. Thus, as more components may be included within a given high device density semiconductor wafer, and as the size of the wafers increases, the detection of manufacturing process defects becomes more critical. Accordingly, various inspection tools, such as those commercially available from KLA-Tencor, Orbot, and Inspex, have been developed to map and record wafer surface features and other defects. The timely and thorough analysis of test data obtained through such inspection equipment is important for quality assurance as well as for achieving and maintaining high production rates for such high density semiconductor wafers.

Various testing instruments and equipment are typically employed in the manufacture of semiconductor devices, some of which may be made by different vendors. Each piece of test equipment makes measurements of specific features or performance indicia in the manufactured devices. For example, test equipment may be used to selectively verify shorts and opens between various nodes in an integrated circuit device. The correlation of the measured shorts and opens in a given die or device within a semiconductor wafer with those of a known good device may be used to indicate whether a device or circuit under test is defective. Where a batch of such devices is processed according to a multi-step manufacturing process, the yield of acceptable products may be advantageously monitored by production personnel in order to make necessary adjustments in one or more steps in the process in order to minimizing defects and down time.

Where a new or modified process is employed for the first time, the yield results may be closely scrutinized. However, the gathering of such first pass yield result data, and the sorting of such into useable form for engineering analysis takes time, during which the process may be continued (potentially at the risk of producing further defects), or the process may be interrupted pending data analysis. Thus, timely gathering, assembly, sorting, formatting, and calculation of such information is desirable. Heretofore, these tasks have been largely performed manually. For instance, process and manufacturing engineering personnel typically download individual sets of raw data from various test equipment into a spreadsheet computer software application. Thereafter, unwanted data is manually deleted, and sorting, reformatting, and computations are performed in order to present the yield results in a useable form for engineering analysis. Due to the increased cost of manufacturing down time, as well as the increased cost of high density semiconductor wafer defects, there remains a need for improved methods and systems for expeditiously generating yield reports.

SUMMARY OF THE INVENTION

The present invention provides a software macro or program and methodology for automated generation of yield reports. The invention finds particular utility in association with the manufacture and testing of semiconductor integrated circuits, although other applications are possible within the scope of the invention. The invention further includes a computer system for generating a yield report. According to one aspect of the invention, there is provided a method of generating a semiconductor manufacturing test first pass yield report, which comprises obtaining raw data from one or more workstream databases into a spreadsheet software application in a computer system, executing a software macro for formatting and sorting the raw data, as well as calculating final yield results, and generating a yield report including the calculated final yield data. The method may further comprise deleting data not required for generating the yield report, and calculating percentage of opens and shorts data by package, wherein generating a first pass yield report may further include using the calculated percentage of opens and shorts data.

According to another aspect of the invention, the macro may include computer-executable instructions for formatting the raw data, sorting the formatted data according to type and/or category, deleting data not required for generating the yield report, and sorting the remaining data according to device package type using the software macro. In addition, computer-executable instructions may be provided for creating at least one worksheet in the spreadsheet software application according to device package type using the software macro, calculating final yield data by package, and calculating percentage of opens and shorts data by package using the software macro. The data may be downloaded from one or more databases via a workstream server, and the deleted data may include quality assurance lot information, reliability lot information, returned lot information, correlation summary information, and unwanted test type information.

In accordance with still another aspect of the invention, there is provided a computer system for generating a semiconductor manufacturing test first pass yield report, which includes a spreadsheet software application, means for obtaining data from a workstream database, and a software macro having computer-executable instructions for formatting and sorting the data as well as calculating yield results.

Yet another aspect of the invention includes a software macro for generating a semiconductor manufacturing test first pass yield report in a computer system. The macro includes computer-executable instructions for formatting raw data from a workstream database, sorting the formatted data according to type, sorting the formatted data according to category, deleting data not required for generating the yield report, sorting the remaining data according to package, creating at least one worksheet in the spreadsheet software application according to package, calculating final yield and percentage of opens and shorts data by package. The macro may further include computer-executable instructions for generating a first pass yield report including the calculated final yield and percentage of opens and shorts data, and for providing calculated final yield and percentage of opens and shorts data for each worksheet. In addition, the macro instructions may provide for downloading the raw data from a workstream server or directly from one or more pieces of manufacturing test equipment, such as test handlers and the like.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 4A is an illustration of exemplary raw data downloaded from a workstream database into a spreadsheet software application in a computer system in accordance with an aspect of the invention;

FIG. 4B is an illustration of an exemplary software macro being executed from within the spreadsheet application of FIG. 4A according to the invention;

FIG. 4C is an illustration of sorted and formatted data in the spreadsheet application of FIGS. 4A and 4B according to another aspect of the invention; and FIG. 4D is an illustration of an exemplary first pass yield report generated in a computer system according to the invention.

DETAILED DESCRIPTION OF THE INVENTION

Figure 1A:
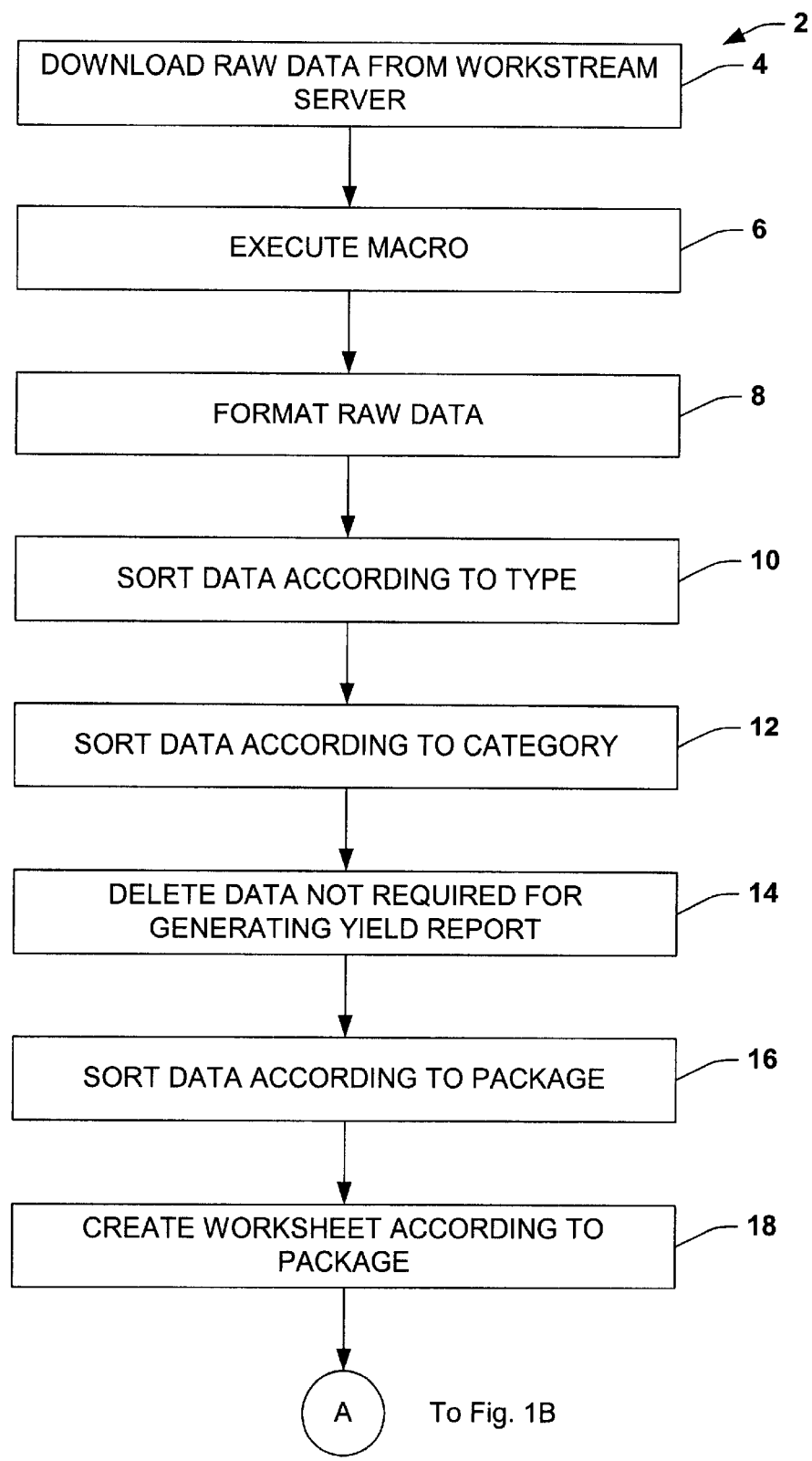
FIG. 1A is a flow diagram illustrating an exemplary method of generating a semiconductor manufacturing test first pass yield report according to an aspect of the present invention.

The following is a detailed description of the present invention made in conjunction with the attached figures, wherein like reference numerals will refer to like elements throughout. The invention provides a software macro or program and methodology for generating yield reports in a useable form from raw data obtained from one or more test instruments and/or equipment. The invention advantageously employs the software macro in a computer system for obtaining, editing, sorting, formatting data from such devices, in addition to performing calculations and generating yield reports in a timely fashion. The macro may be implemented, for example, in a computer software application, such as a spreadsheet program, although other applications and implementations are contemplated as within the scope of the invention. In addition, while the following illustrations and description are provided with respect to the manufacture and testing of semiconductor products, the invention finds utility in other manufacturing endeavors as well.

Figure 1B:
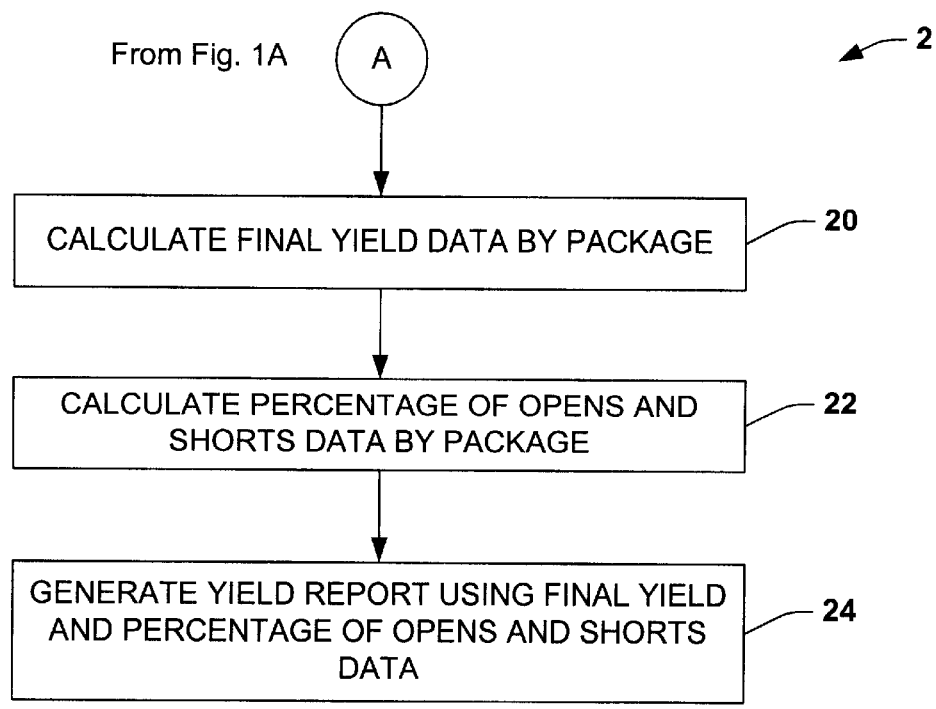
FIG. 1B is a flow diagram further illustrating the exemplary method of FIG. 1A.

Referring now to the drawings, FIGS. 1A and 1B illustrate an exemplary method 2 of generating a semiconductor manufacturing yield report in accordance with an aspect of the invention. The method may be performed, for example, in a computer system via a macro or other software program having computer-executable instructions for performing the various method steps. Beginning at step 4, raw data is obtained or downloaded from a workstream server in to the computer system. As illustrated and described in greater detail hereinafter, the workstream server may be advantageously connected for communications with one or more pieces of test equipment used in the manufacture of semiconductor wafers, and may further include a workstream database having raw data therein. The data may be loaded, for example, into a spreadsheet or other software application program residing in the computer system. Thereafter at step 6, a macro is executed, which may comprise computer-executable instructions for performing one or more tasks. The macro may be executed from within the software application, or externally. In accordance with the macro instructions, the raw data is then formatted at step 8, and sorted according to semiconductor device type and category at steps 10 and 12, respectively.

Continuing at step 14, unneeded data and other extraneous information may be deleted, which is not required for generating the desired yield report. For instance, the macro may delete quality assurance lot information, reliability lot information, returned lot information, correlation summary information, and unwanted test type information. The remaining data is then sorted at step 16 according to semiconductor device package type (e.g., PD32, PL32, TS32, SO44, TS48, FBB, and FBC package types). At step 18, one or more worksheets (e.g., spreadsheet worksheet entities) are created, which may correspond to the device package types.

As illustrated further in FIG. 1B, the method 2 proceeds at step 20 wherein final yield results or data are calculated by package type. In addition, the percentage of opens and shorts data may be calculated at step 22 by device package type. Finally, at step 24, the desired yield report is generated, which includes the final yield and percentage of opens and shorts data calculated at steps 20 and 22, respectively. The exemplary method 2 thus performs useful tasks formerly done manually, which provide manufacturing and process personnel and engineers with relevant report information in a timely fashion. The invention thus reduces the time it takes to analyze process performance results, which is particularly important during first pass or initial production runs. The early availability of such yield results allows the process to be continued after data analysis with minimal down time. In addition, the invention allows a first pass process to be run continuously with periodic report generation and analysis, whereby the risk of producing a large amount of defective product is minimized, due to the early availability of yield data reports.

Referring now to FIGS. 2A–2G, another exemplary method 100 is illustrated in accordance with the present invention, which may be carried out, for example, in a computer system application program using a macro. In this regard, it will be appreciated that the invention further comprises a macro with computer-executable instructions for performing the steps of the exemplary methods 2 and 100. Beginning at step 102, raw test data is obtained from a workstream database (e.g., residing in a workstream server or other test equipment), which is then formatted at step 104 to conform to a spreadsheet software application program (e.g., excel, quattro). Unused columns may then be deleted at step 106 and unused or unnecessary rows may be deleted at step 108 (e.g., correlation information, lot information, and the like). In addition, double print out summary information may be deleted at step 110, after which data may be calculated for normal tests and retests at step 112.

Figure 2A:
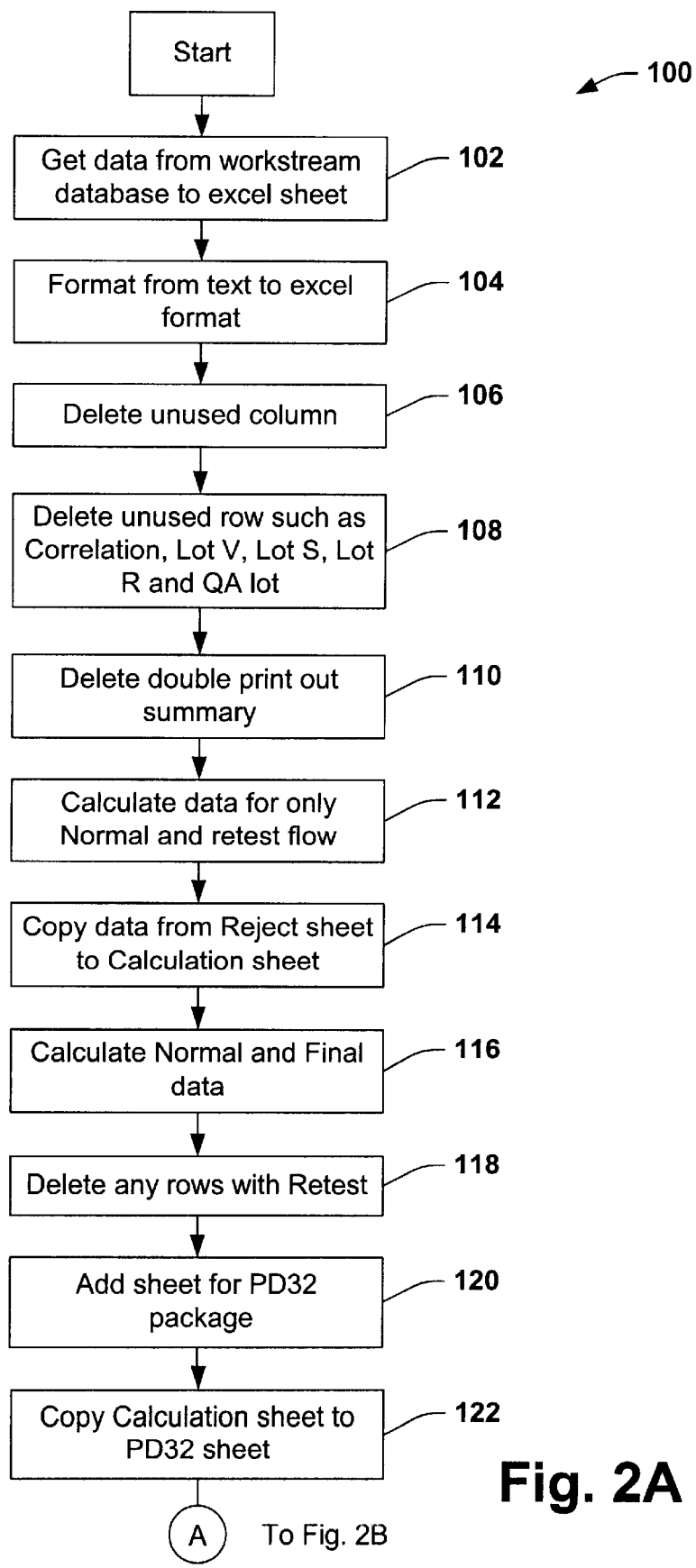
FIG. 2A is a flow diagram illustrating another exemplary method of generating a semiconductor manufacturing test first pass yield report in accordance with the invention.
Figure 2B:
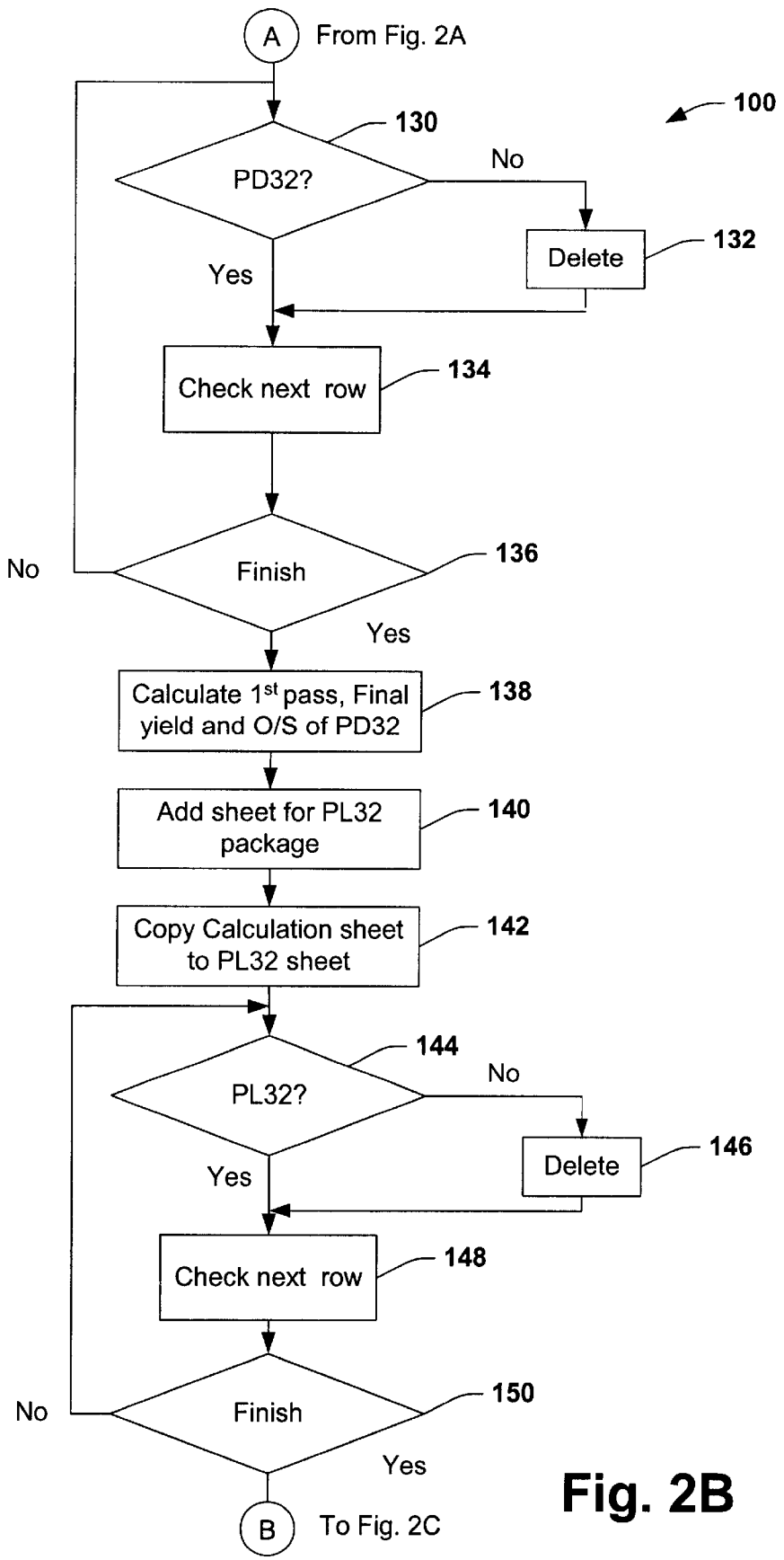
FIG. 2B is a flow diagram further illustrating the exemplary method of FIG. 2A.

Continuing at step 114, data is copied from a reject sheet to a calculation sheet, after which normal and final data is calculated at step 116. Retest rows are then deleted at step 118. At step 120, a worksheet is added for a PD32 package type, where after the calculation sheet to which data was copied at step 114 is copied to the PD32 worksheet at step 122. Referring also to FIG. 2B, the method 100 proceeds at step 130 wherein the first row in the PD32 worksheet is tested to determine whether the data therein relates to a PD32 package type device. If not, the row is deleted at step 132, and if so, the next row is checked at step 134. The method proceeds in this fashion through steps 130, 132, and 134 until it is determined at decision step 136 that all the data rows have been tested. Once all the rows have thus been tested and only those rows relating to the PD32 package type remain in the PD32 worksheet, the first pass final yield data and the percentage of opens and shorts data are calculated at step 138.

Figure 2C:
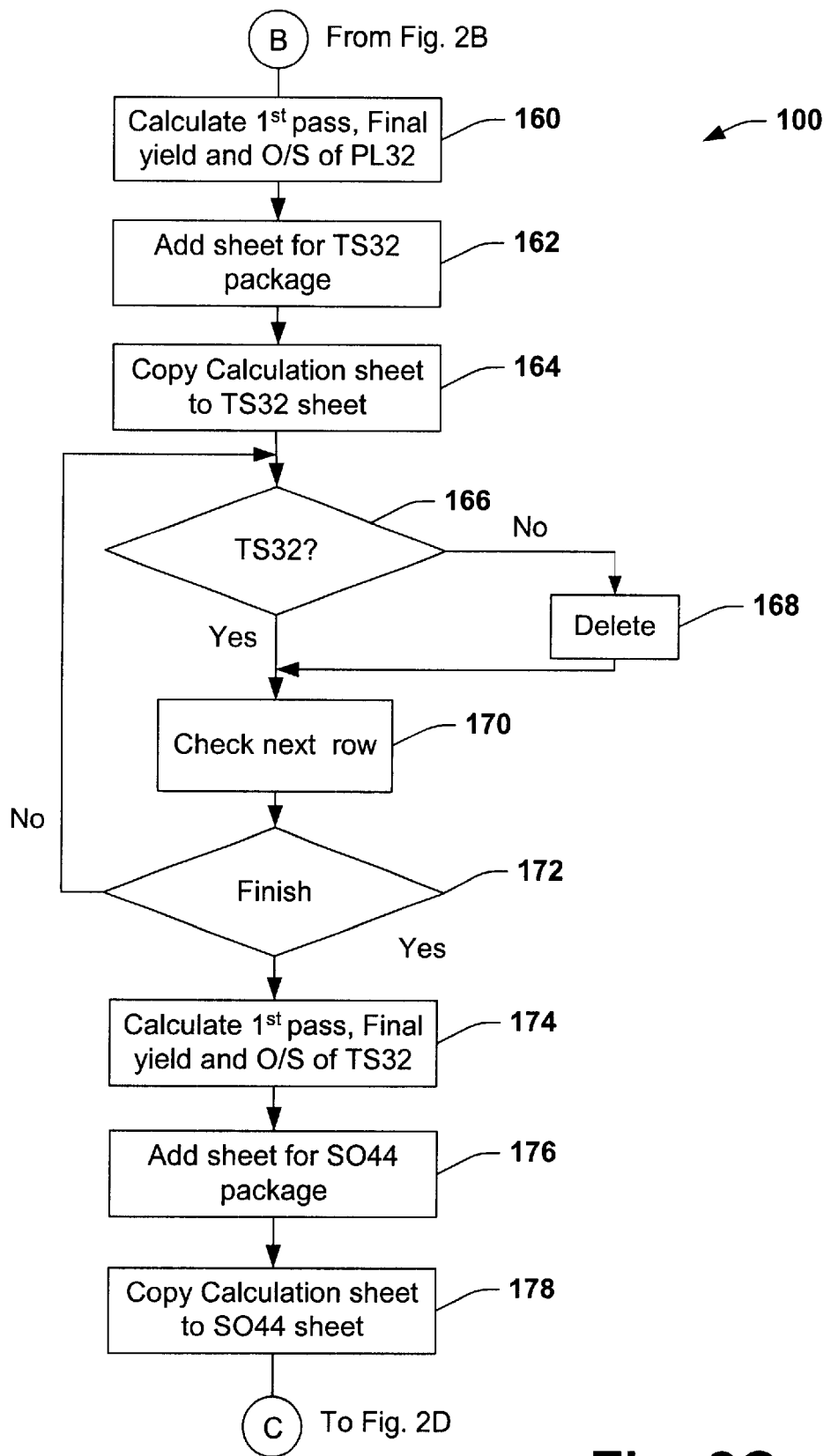
FIG. 2C is a flow diagram further illustrating the exemplary method of FIGS. 2A–2B.

A similar methodology is then applied at steps 140–160 with respect to PL32 device package type data. At step 140, a worksheet is added for the PL32 device package type, to which the calculation sheet (step 114) is copied at step 142. Method 100 then proceeds through steps 144, 146, 148, and 150 to delete data rows in the PL32 worksheet which do not include data for PL32 package type devices. Referring as well to FIG. 2C, once all such data rows have been removed, the first pass final yield data and percentage data for opens and shorts are calculated for the PL32 package devices at step 160.

Proceeding with steps 162–174 for the TS32 device package type, method 100 further includes adding a worksheet for TS32 package type data at step 162 and copying the calculation sheet to the TS32 worksheet at step 164. Thereafter, the data rows in the TS32 worksheet are tested at step 166, and those rows which have data for other package types are deleted at step 168. Proceeding in this fashion through steps 166, 168, 170, and 172, until all rows have been tested, the method 100 continues at step 174 wherein the first pass final yield data and percentage data for opens and shorts are calculated for the TS32 package type devices.

Figure 2D:
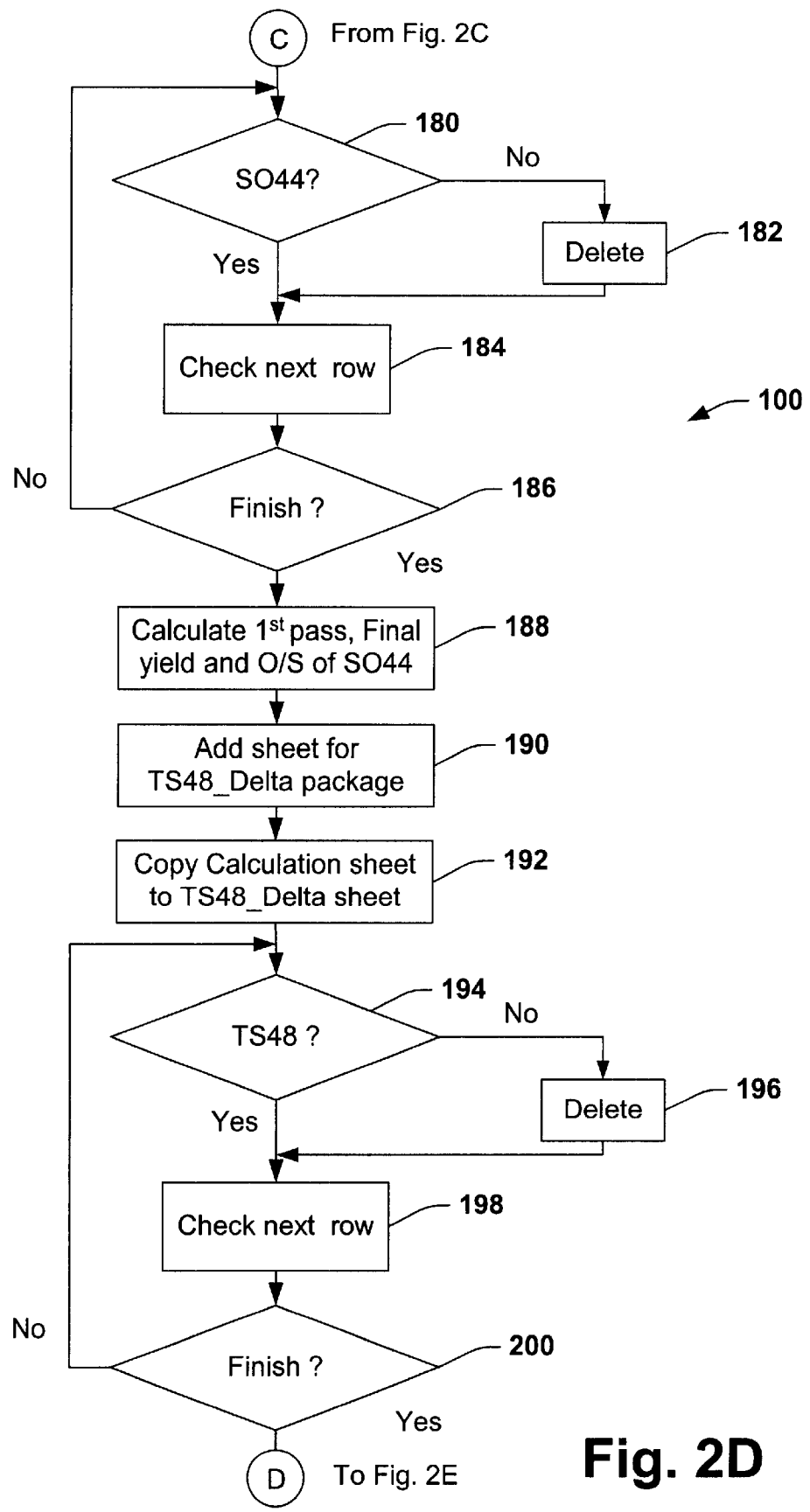
FIG. 2D is a flow diagram further illustrating the exemplary method of FIGS. 2A–2C.
Figure 2E:
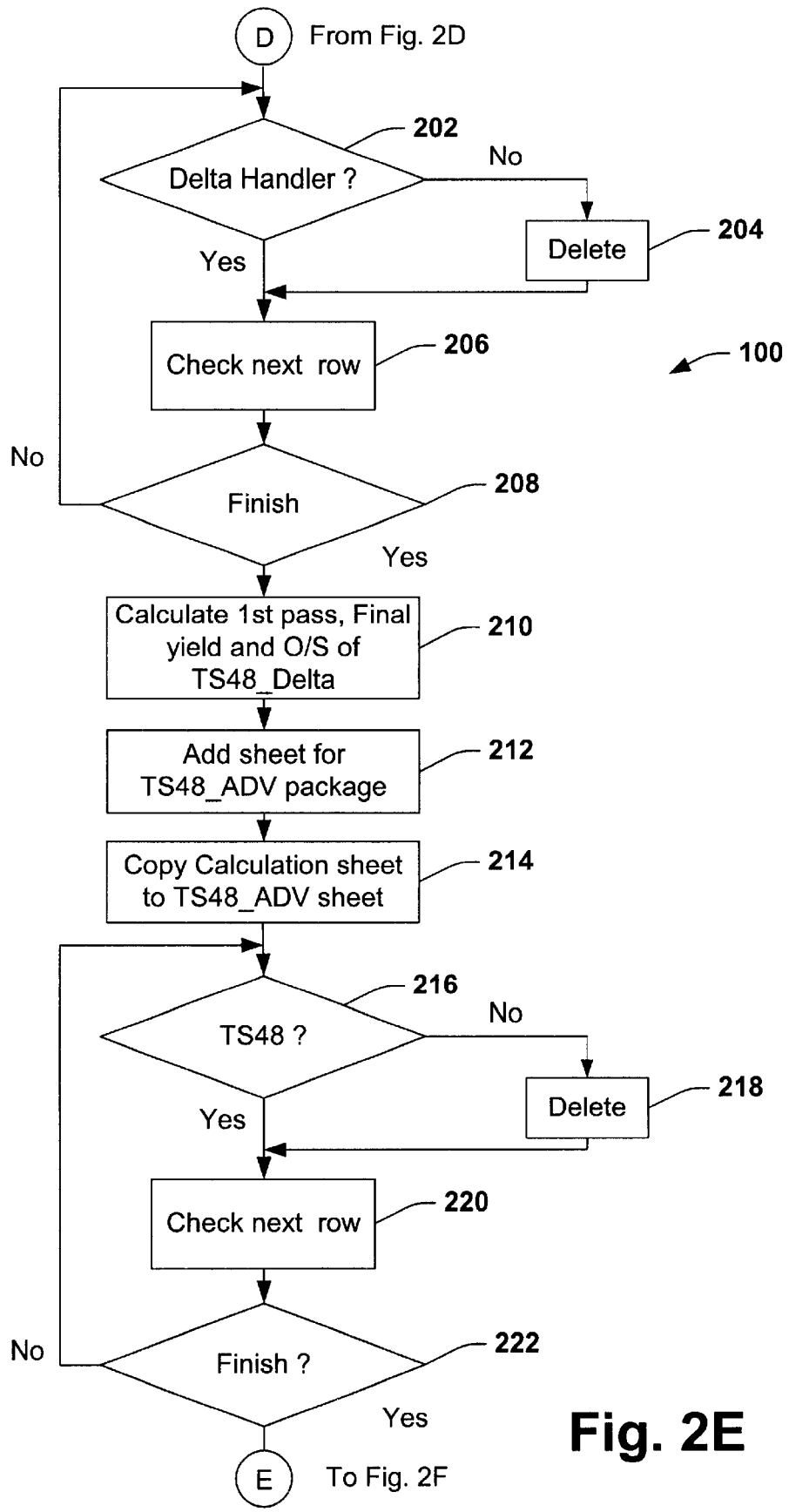
FIG. 2E is a flow diagram further illustrating the exemplary method of FIGS. 2A–2D.

At step 176, a worksheet is added to the spreadsheet application for SO44 package type device data. The calculation sheet is then copied to the SO44 package worksheet at step 178. Referring also to FIG. 2D, the data rows in the SO44 package worksheet are then tested at decision step 180, with rows having data for other package type devices being deleted at step 182. Proceeding in this fashion through steps 180, 182, and 184, the method 100 continues until all the data rows have been tested at step 186. Thereafter, the first pass final yield and opens and shorts data are calculated at step 188.

At this point it will be noted that the invention is applicable as well to manufacturing situations in which devices of a given package type are processed or tested in more than one piece of equipment, which may be from different vendors. For example, in the exemplary method 100, provisions are made for generating separate yield report worksheets for devices of package type TS48 which are tested in Delta-flex brand test handler (e.g., steps 190–210) as well as for TS48 devices tested in an Advantest brand test handler (e.g., steps 212–232). In this regard, it will be appreciated that the invention is applicable to any number of test devices providing data, which may be connected in a network (e.g., local area network (LAN), or wide area network (WAN)), or which may otherwise be adapted to provide data for downloading to a computer system in which the methods and macros of the invention may be implemented.

Continuing at step 190, a worksheet is added for TS48 package devices processed in a Delta handler, into which the calculation sheet is copied at step 192. The rows of data in the TS48 Delta worksheet are then tested at steps 194 and 198, whereby rows having data for devices other than TS48 devices from the Delta handler are deleted at step 196. Proceeding in this fashion, decision step 200 determines that all rows have been checked. Thereafter, referring also to FIG. 2E, the remaining data rows in the TS48 Delta package worksheet are again tested at steps 202 and 206, with rows of data other than that generated in the Delta brand handler being deleted from the worksheet at step 204. Once all such data rows have been deleted at step 208, the first pass yield and opens and shorts data is calculated at step 210 for the TS48 package devices processed in the Delta brand handler.

It will be appreciated that the steps 202, 204, and 206 are provided to include TS48 device package data for devices processed in the Delta brand test handler and to selectively exclude data for other than the Delta handler (e.g., TS48 package devices processed in an Advantest brand handler). In addition, those skilled in the art will appreciate that other methods and macros are conceivable within the scope of the invention to selectively include and/or exclude certain data according to the formatting and information configuration desired for a yield report.

Figure 2F:
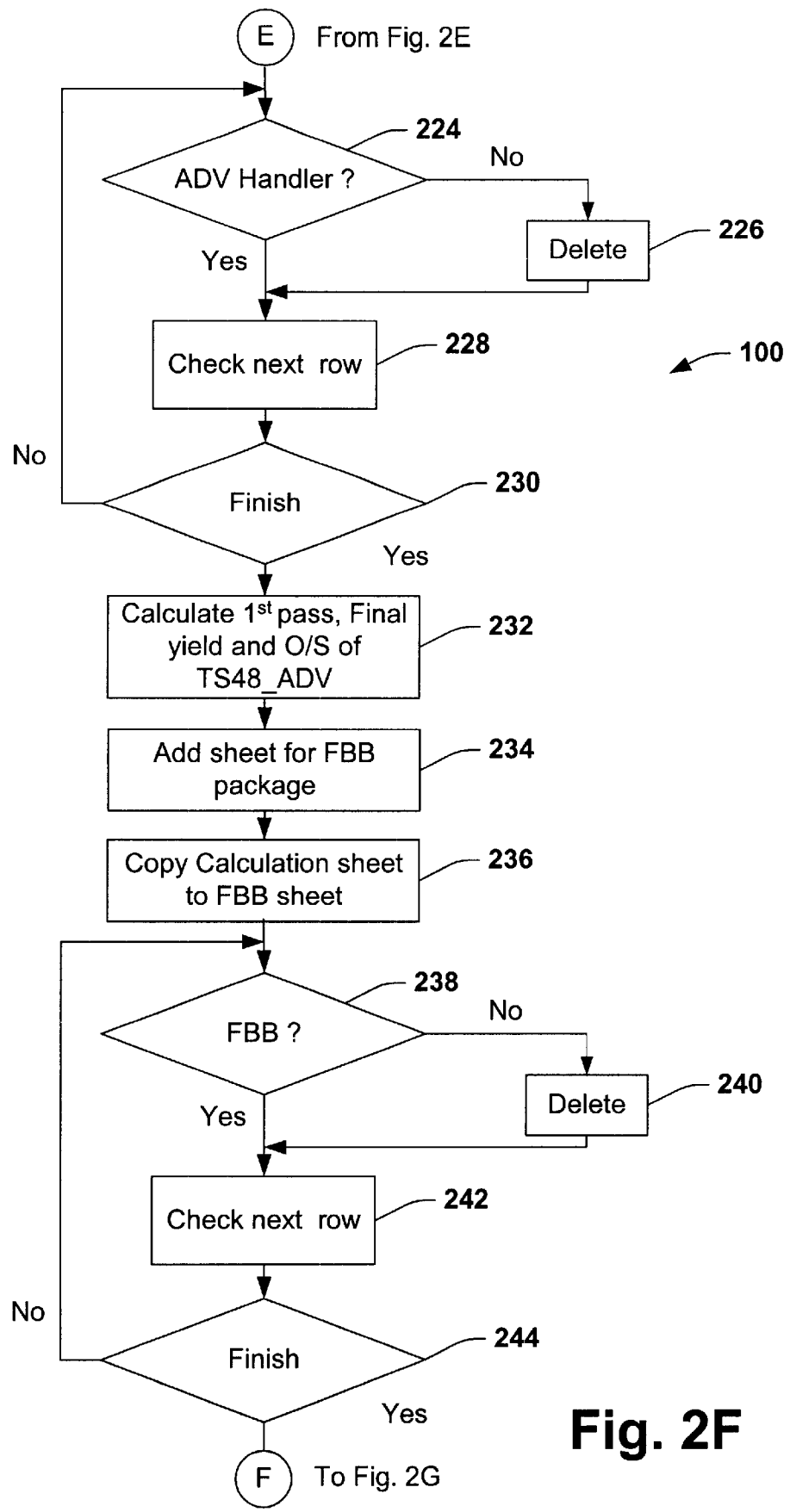
FIG. 2F is a flow diagram further illustrating the exemplary method of FIGS. 2A–2E.
Figure 2G:
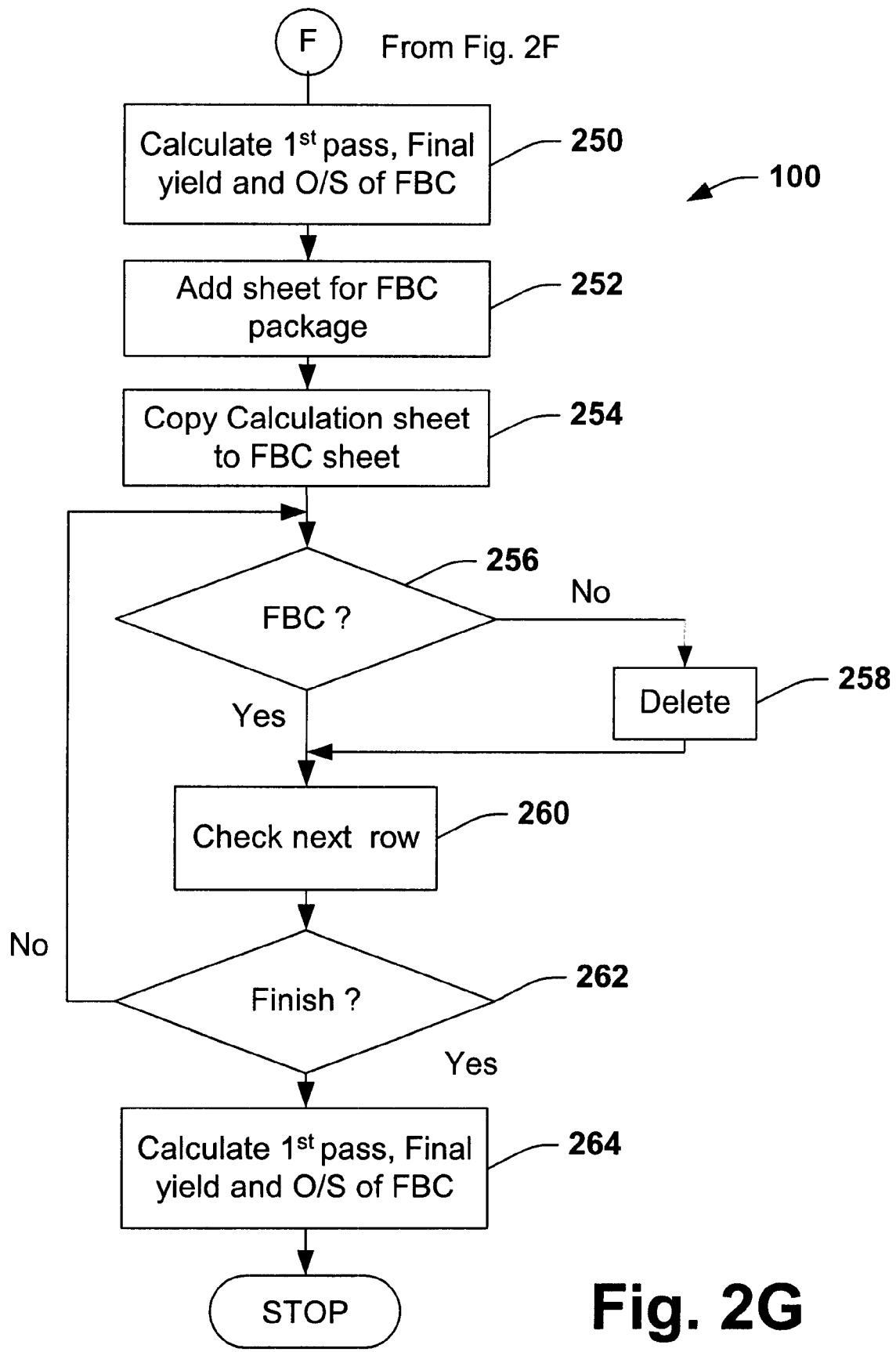
FIG. 2G is a flow diagram further illustrating the exemplary method of FIGS. 2A–2F.

The method 100 then continues in similar fashion at steps 212–232 with respect to TS48 package type devices processed in an Advantest brand test handler. Beginning at step 212, a worksheet is added for TS48 devices processed in the Advantest handler, and the calculation sheet is copied thereto at step 214. Thereafter, rows of data for other than TS48 package type devices are removed via steps 216, 218, 220, and 220, in similar fashion to steps described above. Referring also to FIG. 2F, rows of data for other than devices processed in the Advantest handler are then removed via steps 224, 226, 228, and 230. First pass yield and shorts and opens data are then calculated at step 232 for the TS48 package devices processed in the Advantest handler.

The exemplary method 100 then continues at step 234 where a worksheet is added for FBB package type, where after the calculation sheet to which data was copied at step 114 is copied to the FBB worksheet at step 236. At step 238 the first row in the FBB worksheet is tested to determine whether the data therein relates to an FBB package type device. If not, the row is deleted at step 240, and if so, the next row is checked at step 242. The method 100 proceeds in this fashion through steps 238, 240, and 242 until it is determined at decision step 244 that all the data rows in the FBB worksheet have been tested. Once all the rows have thus been tested and only those rows relating to the FBB package type remain, the first pass final yield data and the percentage of opens and shorts data are calculated at step 250 of FIG. 2G.

At step 252, a worksheet is added for a FBC package type, after which the calculation sheet is copied to the FBC worksheet at step 254. Method 100 then continues at step 256 where the first row in the FBC worksheet is tested to determine whether the data in the row relates to an FBC package type device. If not, the row is deleted at step 258, and if so, the next row is checked at step 260. The method proceeds in this fashion through steps 256, 258, and 260 until it is determined at decision step 262 that all the data rows have been tested. Once all the rows have thus been tested and only those rows relating to the FBC package type remain in the FBC worksheet, the first pass final yield data and the percentage of opens and shorts data are calculated at step 264.

The exemplary methods 2 and 100 illustrated and described above thus provide an efficient automated manner of obtaining raw data from a workstream database, executing a software macro in a computer system, including formatting the raw data, sorting the formatted data, and calculating final yield data by package. In addition the method automatically generates a first pass yield report including the calculated final yield data. However, it will be appreciated that other methods and macros are possible within the scope of the invention. The methods and macros according to the invention may be advantageously employed in a computer system in association with a software application program, such as a spreadsheet, although other implementations are possible. An exemplary system will hereinafter be described in which the invention may be practiced.

Figure 3:
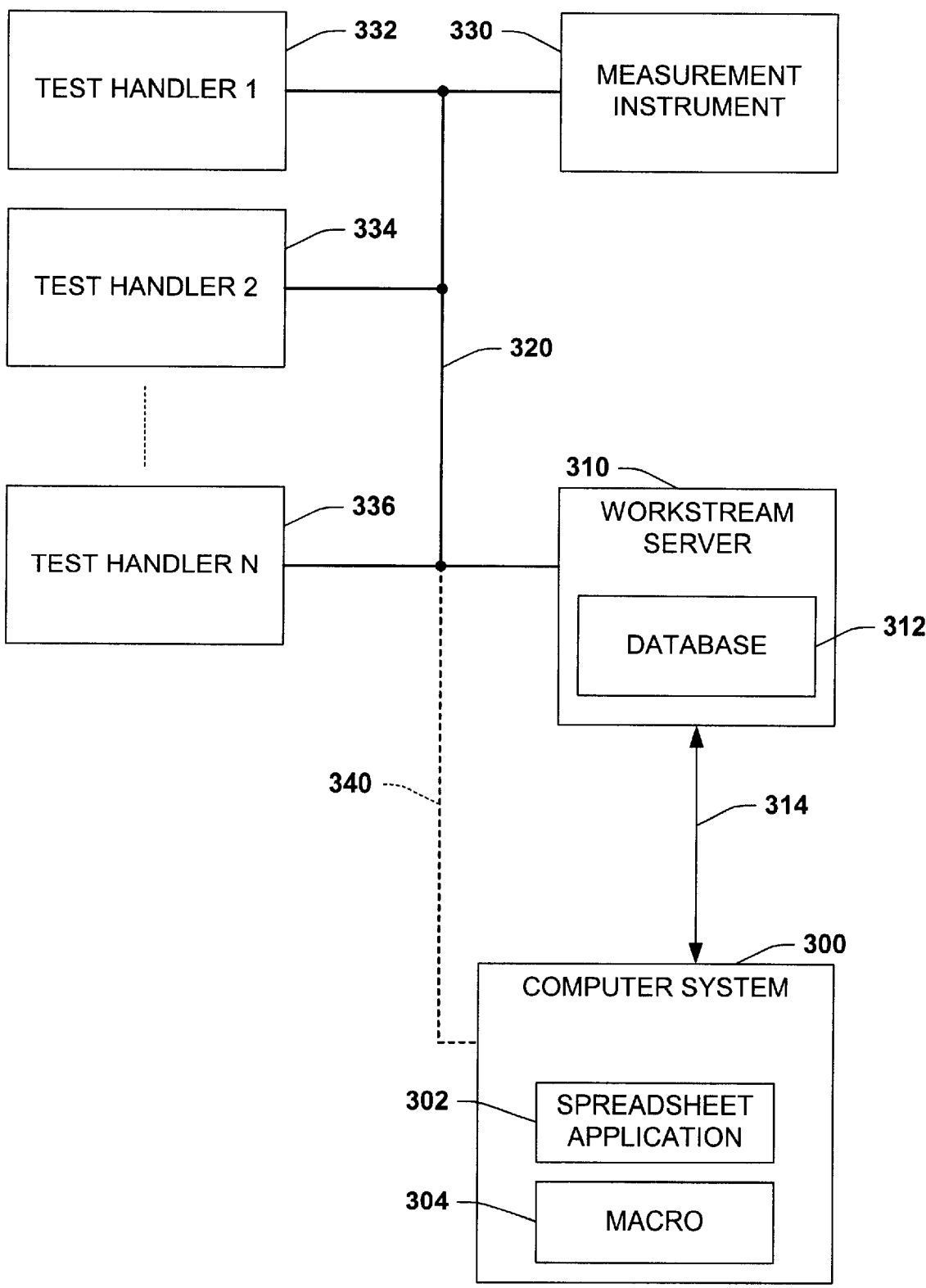
FIG. 3 is a schematic diagram illustrating an exemplary computer system in which various aspects of the invention may be carried out.

Referring now to FIG. 3, an exemplary computer system 300 is illustrated, in which various aspects of the invention may be carried out. The computer system includes a spreadsheet software application program 302 and a software macro 304, along with a processor, memory and user interface (not shown). The computer system 300 is adapted to interface with a workstream server 310 having a workstream database 312 via a communications medium 314 (e.g., RS232 connection, internet connection, network connection, and the like), whereby raw data (not shown) may be obtained or downloaded from the database 312 into the computer system 300 for processing according to the macro 304.

The server 310 is connected via a network 320 to communicate with one or more pieces of test equipment, from which raw test data may be obtained and buffered in the database 312. The network 320 may be any type of network (e.g., local area network (LAN), wide area network (WAN)) as are known, whereby the server may obtain such raw test data from a measurement instrument 330, and/or one or more test handlers 332, 334, and 336. As described above, the test handlers 332, 334, 336, as well as the measurement instrument 330 may be of different vendor origin, providing raw test result data in disparate formats. The exemplary macro 304 as well as the methodologies described above may be adapted to compensate for the disparate data formatting from the test equipment in automatically generating final yield reports for analysis by manufacturing and other personnel, in accordance with the invention. In this regard, the data from individual pieces of test equipment (e.g., 330, 332, 334, and/or 336) may be provided thereby to the workstream server 310, which then stores or buffers such data in the database 312 for subsequent downloading to the computer system 300 according to the macros and methodologies of the invention.

Although the server 310 may advantageously obtain data from the test equipment 330–336 for downloading to the computer system 300, the computer system 300 may further be directly connected to the network 320 via connection 340, or otherwise be adapted to communicate directly with one or more such pieces of test equipment. In this manner, raw test data may be obtained directly from the test equipment for processing and report generation according to another aspect of the invention. Moreover, the computer system 300 may be located remotely from the test equipment 330–336, for example, using the internet or other remote access communications mediums for obtaining data therefrom. The use of the macro 304 for automatically obtaining, sorting, formatting, and editing such raw data, as well as calculating yield and other performance measures, provides significant time and cost savings over prior methods and systems, wherein manufacturing personnel would gather data from individual machines and perform such sorting, formatting, and computational tasks manually before yield analysis could begin.

Figure 4B:
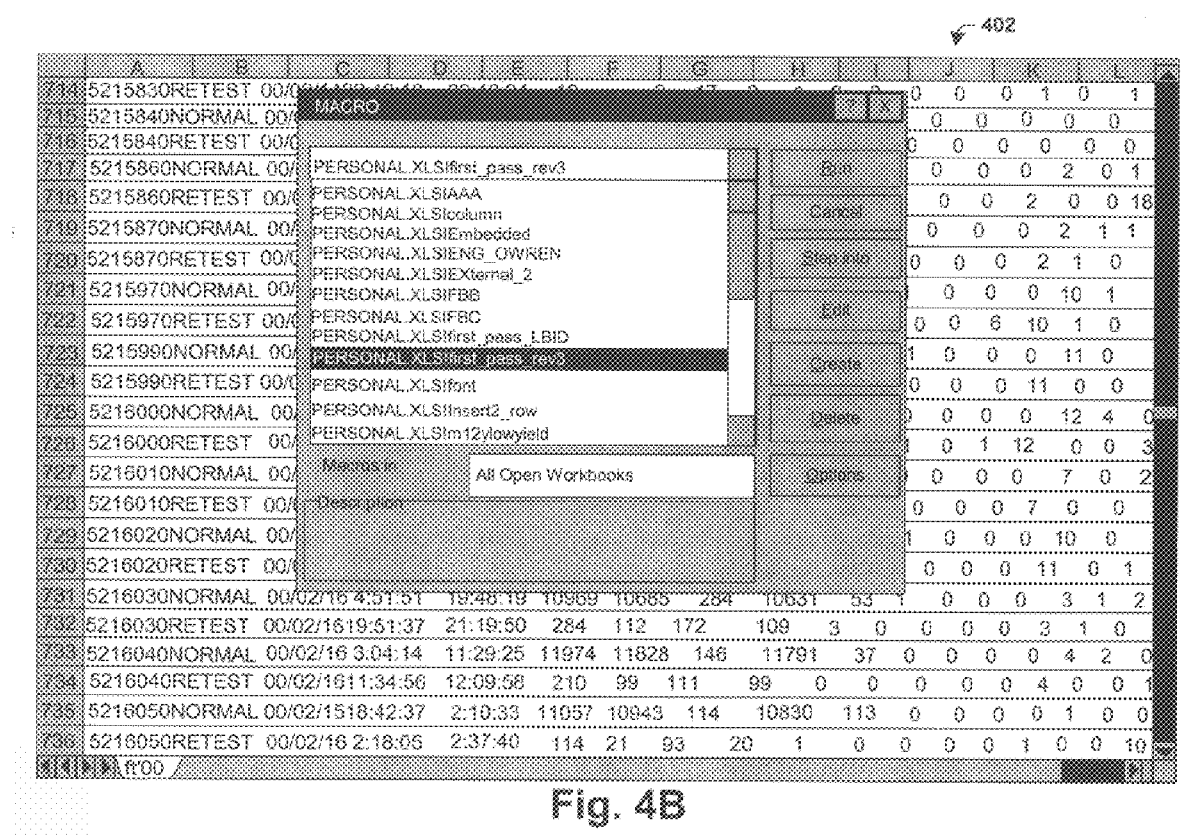

Referring now to FIGS. 4A–4D, an exemplary set of raw data 400 is illustrated, which may be obtained from one or more pieces of test equipment (e.g., 330–336 of FIG. 3) in accordance with the invention. The data may be obtained, for example, via a download of such information from the database 312 of workstream server 310 to the spreadsheet software application program 302 of computer system 300. In FIG. 4B, a macro (e.g., macro 304 of FIG. 3) may be executed from within the spreadsheet application, for example, via a pop-up window user interface 402. The macro then sorts and formats the raw data set 400 of FIG. 4A, in order to obtain sorted and formatted data 404 in the spreadsheet application, as illustrated in FIG. 4C. Thereafter, one or more first pass yield reports may be generated from the sorted and formatted data 404, as illustrated in FIG. 4D.

As shown, the report may include separate spreadsheet worksheets for individual device package types (e.g., PD32, PL32, TS32, SO44, TS48, FBB, and FBC package types), and may further separate similar package type data according to devices processed by different pieces of test equipment (e.g., TS48 package type devices processed in Delta and Advantest brand test handlers, as illustrated and described above). It will be appreciated that the macro may, but need not be executed from within another software application program, and further that many report styles and formats other than those specifically illustrated herein are possible and considered to fall within the scope of the present invention.

Although the invention has been shown and described with respect to one or more implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the term "includes" is used in either the detailed description and the claims, such term is intended to be inclusive in a manner similar to the term "comprising."

What is claimed is:

1. A method of generating a semiconductor manufacturing yield report, comprising:
   downloading raw data from at least one workstream database into a spreadsheet software application in a computer system, wherein the downloading raw data from at least one workstream database comprises downloading the raw data from a workstream server;
   executing a software macro in the computer system, comprising:
      formatting the raw data using the software macro;
      sorting the formatted data according to type using the software macro;
      sorting the formatted data according to category using the software macro;
      deleting data not required for generating the yield report;
      sorting the remaining data according to package type using the software macro;
      creating at least one worksheet in the spreadsheet software application according to package type using the software macro;
      calculating final yield data by package type using the software macro; and
      calculating percentage of opens and shorts data by package type using the software macro; and
   generating the yield report comprising the calculated final yield and percentage of opens and shorts data.

2. The method of claim 1, wherein deleting data not required for generating the yield report comprises deleting quality assurance lot information, deleting reliability lot information, deleting returned lot information, deleting correlation summary information, and deleting unwanted test type information.

3. The method of claim 1, wherein generating the yield report comprises providing calculated final yield and percentage of opens and shorts data for each worksheet according to package type.

4. The method of claim 3, wherein deleting data not required for generating the yield report comprises deleting quality assurance lot information, deleting reliability lot information, deleting returned lot information, deleting correlation summary information, and deleting unwanted test type information.

5. The method of claim 4, wherein downloading raw data from at least one workstream database comprises downloading the raw data from a workstream server.

6. A computer system for generating a semiconductor manufacturing yield report, comprising:
   a spreadsheet software application;
   means for downloading raw data from at least one workstream database into the spreadsheet software application, the means for downloading raw data from at least one workstream database comprises means for downloading the raw data from a workstream server; and
   a software macro having computer-executable instructions for:
      formatting the raw data;
      sorting the formatted data according to type;
      sorting the formatted data according to category;
      deleting data not required for generating the yield report;
      sorting the remaining data according to package type;
      creating at least one worksheet in the spreadsheet software application according to package type;
      calculating final yield data by package type; and
      calculating percentage of opens and shorts data by package type.

7. The computer system of claim 6, wherein the software macro further comprises computer-executable instructions for generating a yield report comprising the calculated final yield and percentage of opens and shorts data.

8. The computer system of claim 7, wherein the computer-executable instructions for generating the first pass yield report comprises computer-executable instructions for providing calculated final yield and percentage of opens and shorts data for each worksheet according to package type.

9. The computer system of claim 8, wherein the computer-executable instructions for deleting data not required for generating the yield report further comprises computer-executable instructions for deleting quality assurance lot information, deleting reliability lot information, deleting returned lot information, deleting correlation summary information, and deleting unwanted test type information.

10. The computer system of claim 9, wherein the means for downloading raw data from at least one workstream database comprises means for downloading the raw data from a workstream server.

11. The computer system of claim 6, wherein the computer-executable instructions for deleting data not required for generating the yield report further comprises computer-executable instructions for deleting quality assurance lot information, deleting reliability lot information, deleting returned lot information, deleting correlation summary information, and deleting unwanted test type information.

12. A software macro for generating a semiconductor manufacturing pass yield report in a computer system, comprising computer-executable instructions for:

formatting raw data from a workstream database;

sorting the formatted data according to type;

sorting the formatted data according to category;

deleting data not required for generating the yield report;

sorting the remaining data according to package type;

creating at least one worksheet in the spreadsheet software application according to package type;

calculating final yield data by package type; and calculating percentage of opens and shorts data by package type;

wherein the computer-executable instructions for downloading raw data from at least one workstream database comprises computer-executable instructions for downloading the raw data from a workstream server.

13. The macro of claim 12, further comprising computer-executable instructions for generating a yield report comprising the calculated final yield and percentage of opens and shorts data.

14. The macro of claim 13, wherein the computer-executable instructions for deleting data not required for generating the yield report comprises computer-executable instructions for deleting quality assurance lot information, deleting reliability lot information, deleting returned lot information, deleting correlation summary information, and deleting unwanted test type information.

15. The macro of claim 13, wherein the computer-executable instructions for generating the first pass yield report comprises computer-executable instructions for providing calculated final yield and percentage of opens and shorts data for each worksheet according to package type.

16. The macro of claim 15, wherein the computer-executable instructions for downloading raw data from at least one workstream database comprises computer-executable instructions for downloading the raw data from a workstream server.

17. The macro of claim 12, wherein the computer-executable instructions for deleting data not required for generating the yield report comprises computer-executable instructions for deleting quality assurance lot information, deleting reliability lot information, deleting returned lot information, deleting correlation summary information, and deleting unwanted test type information.

18. In a computer system, a method for generating a yield report, comprising:

obtaining raw data from a piece of test equipment comprising downloading the raw data from a workstream server;

executing a software macro in the computer system, comprising:

formatting the raw data;

sorting the formatted data; and calculating final yield data by package type; and generating the yield report comprising the calculated final yield data.

19. The method of claim 18, further comprising deleting data not required for generating the yield report.

20. The method of claim 18, further comprising calculating percentage of opens and shorts data by package type, wherein generating the yield report further comprises using the calculated percentage of opens and shorts data.

* * * * *